(12) United States Patent
Du et al.

(10) Patent No.: US 7,536,856 B2
(45) Date of Patent: May 26, 2009

(54) SYSTEM FOR CONTROLLING A POWER OUTPUT

(75) Inventors: Hongliu Du, Dunlap, IL (US); Tony L. Marcott, Peoria, IL (US); Saurabh Pandey, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 173 days.

(21) Appl. No.: 11/289,701

(22) Filed: Nov. 30, 2005

(65) Prior Publication Data

US 2007/0119161 A1   May 31, 2007

(51) Int. Cl.
*F16D 31/02* (2006.01)
(52) U.S. Cl. .......................................... 60/451; 60/445
(58) Field of Classification Search ............ 60/445, 60/451
See application file for complete search history.

(56) References Cited

U.S. PATENT DOCUMENTS

| 3,685,290 | A | * | 8/1972 | Krusche ........................ 60/452 |
| 4,189,921 | A |   | 2/1980 | Knapp |
| 4,261,229 | A |   | 4/1981 | Mizuno et al. |
| 4,612,827 | A | * | 9/1986 | Omitsu ........................ 477/43 |
| 5,062,498 | A |   | 11/1991 | Tobias |
| 5,190,445 | A |   | 3/1993 | Ikari |
| 5,481,875 | A |   | 1/1996 | Takamura et al. |
| 6,010,309 | A |   | 1/2000 | Takamura et al. |
| 6,170,587 | B1 |   | 1/2001 | Bullock |
| 6,358,174 | B1 |   | 3/2002 | Folsom et al. |
| 6,424,902 | B1 |   | 7/2002 | Kuras |
| 6,622,484 | B2 |   | 9/2003 | Hopkins |
| 6,684,636 | B2 |   | 2/2004 | Smith |
| 6,695,693 | B2 |   | 2/2004 | Ho et al. |
| 2005/0071066 | A1 |   | 3/2005 | Rose et al. |

FOREIGN PATENT DOCUMENTS

| DE | 28 48595 | 5/1980 |
| DE | 43 08 198 | 7/1994 |
| EP | 0041273 | 12/1981 |
| GB | 2102922 | 2/1983 |

OTHER PUBLICATIONS

U.S. Appl. No. 11/269,392, filed Nov. 8, 2005.

* cited by examiner

*Primary Examiner*—F. Daniel Lopez
(74) *Attorney, Agent, or Firm*—Finnegan, Henderson, Farabow, Garrett & Dunner

(57) ABSTRACT

A system for controlling a power output is disclosed. The system includes a hydraulic actuator configured to output a first torque and a source of pressurized fluid configured to supply a flow of pressurized fluid to the hydraulic actuator. The system further includes a controller configured to control the flow of pressurized fluid as a function of the first torque, a predetermined torque, and changes to the first torque caused by a load operatively connected to the hydraulic actuator.

17 Claims, 2 Drawing Sheets

SYSTEM FOR CONTROLLING A POWER OUTPUT

BRIEF DESCRIPTION OF THE DRAWINGS

1. Technical Field

The present disclosure relates to a system for controlling a power output, and more particularly, to a method and apparatus for controlling a torque and/or a speed output.

2. Background

Figure 1:
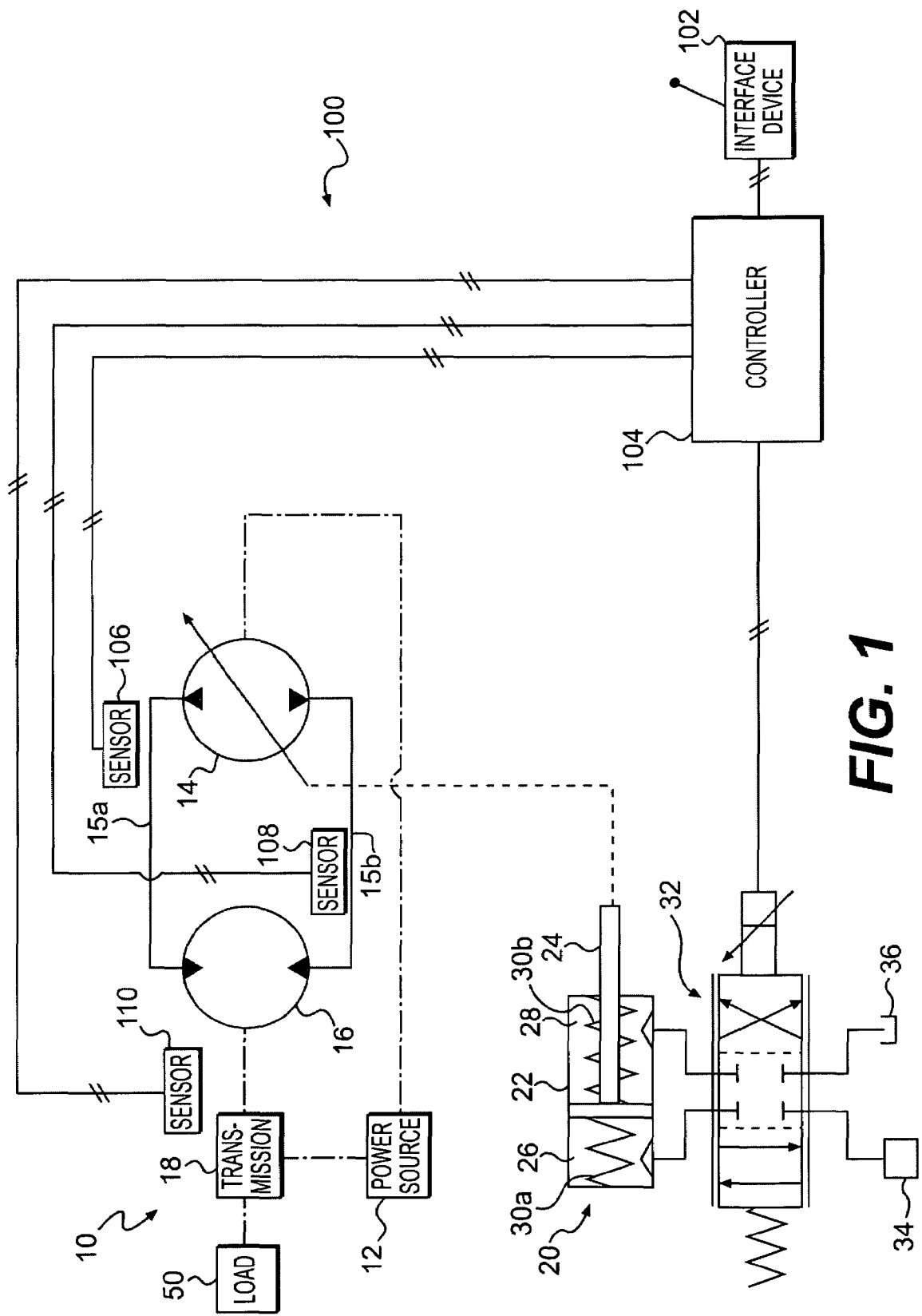

Work machines such as, for example, dozers, loaders, excavators, motor graders, dump trucks, and other types of machinery typically include a power transmission system to transfer power, e.g., torque and rotational speed generated by a power source, to one or more connected loads, e.g., one or more components of the work machine. Such power transmission systems often include a fixed ratio transmission operably connected to a power source and configured to convert power into one or more desired power ratios, e.g., one or more desired torque and speed ratios, to operate a connected load. Fixed ratio transmissions typically include one or more discrete gear ratios through which the power generated by the power source is converted to drive the load in a step-wise manner requiring a manually or automatically controlled gear shift to select different gear ratios as the load changes. A deficiency with such a transmission system is the inability to output torque and/or speed at ratios other than the discrete gear ratios.

An improved power transmission system may include two transmissions operatively connected to a single power source. One of the two transmissions is typically a fixed ratio transmission and the other of the two is typically a variable ratio transmission connected in parallel to the fixed ratio transmission. The power output of the variable ratio transmission can be adjusted to selectively complement the discrete power ratios of the fixed gear transmission to provide a continuously variable output of torque and speed ratios. Such a power transmission system is commonly referred to as a "step-less" transmission. A step-less transmission often includes a hydro-mechanical transmission including a variable output pump drivingly connected to a hydraulic motor operatively connected to a fixed ratio transmission. As such, variations in the pump output affect variations in power output from the hydraulic motor which is combined with the discrete power ratios of the fixed ratio transmission to provide a continuously variable output of torque and speed ratios.

U.S. Pat. No. 4,261,229 ("the '229 patent") issued to Mizuno et al. discloses a speed ratio control system including an engine operatively connected to a hydro-mechanical transmission having a pump, a motor, and a plurality of gear ratios controlled by a controller as a function of a desired engine output and an actual engine output. Specifically, the controller of the '229 patent produces a control signal in accordance with a deviation established by comparing the desired engine output and the actual engine output. The control signal is configured to drive an actuator that operatively changes a displacement of the pump and, in turn, changes a speed ratio of the hydro-mechanical transmission.

Although the system of the '229 patent may provide a speed ratio control, it might not adequately adjust to changing loads operatively connected to the hydro-mechanical transmission. Because work machines may be exposed to significant and/or rapid changes in loads, e.g., changing terrains over which a work machine may travel or changing soil characteristics through which a work implement moves, the system of the '229 patent might not adequately adjust the speed ratio based on a desired and actual engine output. Also, the system of the '229 patent might not adequately maintain a desired torque and/or speed output from the hydro-mechanical transmission as an operatively connected load changes magnitude, e.g., the system of the '229 patent might not adequately vary a speed output to maintain a desired torque output and may not vary a torque output to maintain a desired speed output. Furthermore, the '229 patent may require a complex control system and apparatus to affect changes in the speed ratio.

The present disclosure is directed to overcoming one or more of the problems set forth above.

SUMMARY OF THE INVENTION

In one aspect, the present disclosure is directed to a system for controlling a power output. The system also includes a hydraulic actuator configured to output a first torque and a source of pressurized fluid configured to supply a flow of pressurized fluid to the hydraulic actuator. The system further includes a controller configured to control the flow of pressurized fluid as a function of the first torque, a predetermined torque, and changes to the first torque caused by a load operatively connected to the hydraulic actuator.

In another aspect, the present disclosure is directed to a method of controlling a power output. The method includes supplying a first flow of pressurized fluid to a hydraulic actuator and generating a first torque. The first torque selectively changes as a function of a load operatively connected to the hydraulic actuator. The method also includes selectively controlling the first flow of pressurized fluid as a function of a desired torque and the first torque.

In yet another aspect, the present disclosure is directed to a transmission system. The transmission includes a power source configured to produce a torque and a speed. The transmission also includes a first transmission device operatively connected to the power source and configured to output a first power output to a load. The transmission also includes a second transmission device operatively connected to the power source and the first transmission. The second transmission is configured to output a second power output to the first transmission. The transmission further includes a controller configured to vary the second power output as a function of a desired first power output and the load.

BRIEF DESCRIPTION OF THE DRAWING

FIG. 1 is a schematic illustration of an exemplary transmission system in accordance with the present disclosure.

Figure 2:
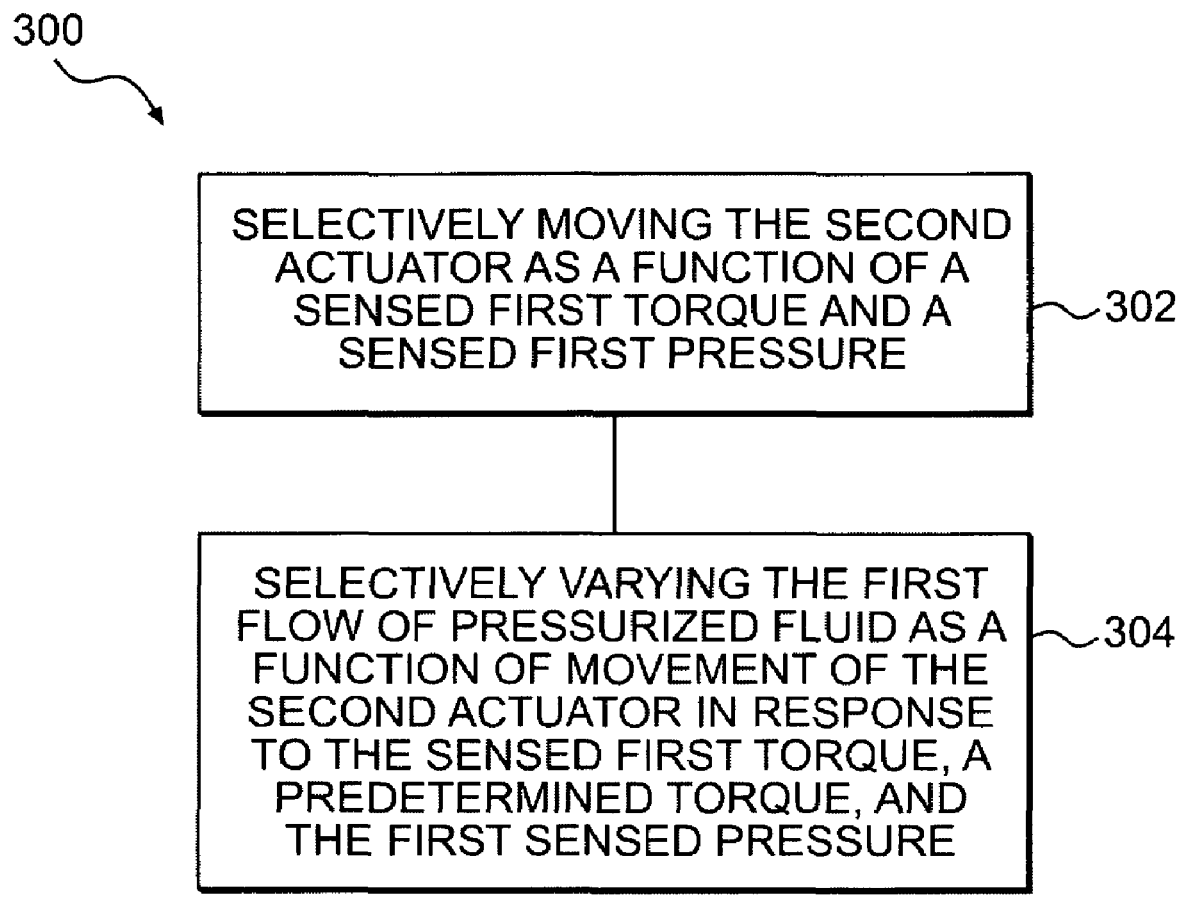

FIG. 2 is a flow chart illustrating an exemplary disclosed method performed by the controller of FIG. 1.

DETAILED DESCRIPTION

FIG. 1 illustrates an exemplary system 10 for controlling a power output. System 10 may be configured to generate and output power to a load 50. System 10 may include a power source 12, a hydraulic source 14, a hydraulic actuator 16, and a transmission 18. System 10 may also include an actuator 20, a valve 32, and a control system 100 configured to control the operation of hydraulic source 14 and, as a result, affect a power output of transmission 18. Specifically, power source 12 may be operatively connected to hydraulic source 14 and to transmission 18 in parallel and hydraulic source 14 may be operatively connected to hydraulic actuator 16 and to transmission 18 in series. As such, power source 12 may be operatively connected to transmission 18 in two parallel paths.

Transmission 18 may be subsequently connected to load 50 to provide power thereto. It is contemplated that load 50 may include any variable or constant load desired to be driven by transmission 18, such as, for example, one or more traction devices, one or more work implements, and/or one or more frame members of a work machine. It is also contemplated that changing external conditions may affect the type and/or magnitude of load 50. It is further contemplated that load 50 may include a plurality of loads.

Power source 12 may include an engine such as, for example, a diesel engine, a gasoline engine, a gaseous fuel driven engine, or any other engine known in the art. Power source 12 may be configured to supply power, e.g., torque and rotational speed, to hydraulic source 14, output transmission 18, and/or additional components of system 10. It is contemplated that power source 12 may alternately include another source of power such as a fuel cell, a power storage device, an electric or hydraulic motor, and/or another source of power known in the art. It is also contemplated that power source 12 may be operatively connected to transmission 18 and/or hydraulic source 14 by any suitable manner known in the art, such as, for example, gearing, a countershaft, and/or a belt.

Hydraulic source 14 may be configured to produce a variable output of pressurized fluid and may include a swash plate pump and/or any other type of variable displacement pump. Hydraulic source 14 may be fluidly connected to hydraulic actuator 16 via first and second passages 15a, 15b to thereby affect operation of hydraulic actuator 16. Specifically, first and second passages 15a, 15b may communicate an output flow of pressurized fluid from hydraulic source 14 to hydraulic actuator 16 and may communicate an input flow of pressurized fluid from hydraulic actuator 16 to hydraulic source 14. As such, hydraulic source 14 may establish a circulation flow of pressurized fluid and, as a result, a pressure differential between first and second passages 15a, 15b. It is contemplated that hydraulic source 14 may provide pressurized fluid to hydraulic actuator 16 at varying flow rates by, for example, varying an angle of a swashplate. It is also contemplated that hydraulic source 14 may selectively supply an output flow of pressurized fluid to hydraulic actuator 16 via either one of first or second passages 15a, 15b dependent upon, for example, an angle of a swashplate.

Hydraulic actuator 16 may include a fixed displacement hydraulic motor and may be fluidly connected to hydraulic source 14 via first and second passages 15a, 15b. Specifically, hydraulic actuator 16 may be configured to convert a pressure differential established by hydraulic source 14 into a power output via, for example, a plurality of pumping chambers, a propeller, and/or other suitable device known in the art. Hydraulic actuator 16 may be operatively connected to transmission 18 to thereby deliver a power to transmission 18 to thereby affect operation of transmission 18. It is contemplated that hydraulic actuator 16 may be connected to transmission 18 in any suitable manner known in the art, such as, for example, gearing, a countershaft, and/or a belt. It is also contemplated that hydraulic actuator 16 may alternatively include a variable displacement motor.

Transmission 18 may include any conventional transmission, such as, for example, a planetary gear system having one or more gear ratios, configured to receive power inputs and deliver power outputs to load 50. Specifically, transmission 18 may be configured to receive a first power input from power source 12 and a second power input from hydraulic actuator 16, combine the first and second power inputs, and deliver a common power output to load 50. It is contemplated that the first and second power inputs may be at different torques and/or speeds. It is also contemplated that the first and second power inputs may vary dependent upon operating conditions of system 10 and, as such, transmission 18 may provide variable output torques and/or rotational speeds to load 50 as a function of the varying first and second power inputs. It is further contemplated that a power output of transmission 18 and hydraulic actuator 16 may vary dependent upon different and/or changing loads as is conventional in the art.

Actuator 20 may be configured to vary the amount of flow output from hydraulic source 14. Specifically, actuator 20 may include a cylinder 22 and a piston 24 separating cylinder 22 into first and second chambers 26, 28. Piston 24 may be movable relative to cylinder 22 in response to an imbalance of forces acting on opposite sides of piston 24 as is conventional in the art. An imbalance of forces may be caused by communicating pressurized fluid having a relatively higher pressure to one of first and second chambers 26, 28 and communicating a pressurized fluid having a relatively lower pressure to the other one of first and second chambers 26, 28. Movement of piston 24 relative to cylinder 22 may cause an extension or retraction of actuator 20 which may affect the flow output of hydraulic source 14. For example, piston 24 may be operatively connected to a swashplate of hydraulic source 14 and movement of piston 24 may change the angle of the swashplate to thereby change the output flow of hydraulic source 14. It is contemplated that cylinder 20 may be operatively connected to a relatively fixed member with respect to hydraulic source 14. It is also contemplated that, alternatively, cylinder 20 may be operatively connected to hydraulic source 14 and piston 24 may be operatively connected to a relatively fixed member with respect to hydraulic source 14.

Actuator 20 may also include first and second springs 30a, 30b each configured to bias piston 24 in opposite directions with respect to cylinder 22. Specifically, first and second springs 30a, 30b may be configured to bias piston 24 toward a neutral position, e.g., toward a position in which hydraulic source 14 may not produce a flow of pressurized fluid. It is contemplated that one or both of first and second springs 30a, 30b may be omitted as desired.

Valve 32 may be configured to selectively supply pressurized fluid to first and second chambers 26, 28 to thereby affect movement of piston 24 relative to cylinder 22. Specifically, valve 32 may be configured to selectively fluidly communicate a high pressure source 34 to one of first second chambers 26, 28 and selectively fluidly communicate a low pressure source 36 to the other one of first and second chambers 26, 28. As such, valve 32 may establish a pressure differential across piston 24. Valve 32 may include a proportional spring biased valve mechanism that may be solenoid actuated and configured to move between several positions to selectively affect proportional movement of piston 24. For example, valve 32 may include a first position in which pressurized fluid is substantially blocked from flowing to or from actuator 20. Valve 32 may be proportionally movable toward a second position (illustrated as the left most valve position in FIG. 1) allowing an increasing flow of pressurized fluid from high pressure source 34 toward first chamber 26 and allowing an increasing flow of pressurized fluid flow from second chamber 28 toward low pressure source 36. Valve 32 may also be movable toward a third position (illustrated as the right most valve position in FIG. 1) allowing an increasing flow of pressurized fluid from high pressure source 34 toward second chamber 28 and allowing an increasing flow of pressurized fluid from first chamber 26 toward low pressure source 36. It is contemplated that valve 32 may vary the flow of pressurized fluid to and/or from first and second chambers 26, 28 by an suitable proportion, such as, for example, linearly and/or non-linearly.

High pressure source 34 may include any source of pressurized fluid, such as, for example, a pump or an accumulator. Low pressure source 36 may include any source of pressurized fluid, such as, for example, a tank or a reservoir. It is contemplated that high pressure source 34 may include pressurized fluid at any pressure higher than a pressure of pressurized fluid included in low pressure source 36. It is also contemplated that the pressurized fluid may be any working fluid known in the art, such as, for example, lubrication fluid, transmission fluid, a dedicated fluid, and/or a shared fluid.

Control system 100 may be configured to affect the power output of hydraulic actuator 16. Specifically, control system 100 may include an operator interface device 102, a controller 104, and sensors 106, 108, 110. Operator interface device 102 may include any known device configured to deliver inputs from an operator to controller 104, such as, for example, a pedal, a joystick, and/or a lever. For example, operator interface device 102 may include a throttle control configured to deliver a signal indicative of a power output desired to be delivered to load 50. Sensors 106, 108 may include any known sensor configured to transmit a signal indicative of a pressure of a pressurized fluid to controller 104, such as, for example, a pressure transducer. Specifically sensors 106, 108 may each be configured to deliver a signal indicative of a pressure of pressurized fluid within first and second passages 15a, 15b. Sensor 110 may include any known sensor configured to deliver a signal indicative of the power output of hydraulic actuator 16. It is contemplated that sensor 110 may include two sensors, one of which may be configured to transmit a signal indicative of a rotational speed of the power output, e.g., a hall effect sensor, and the other one of which may be configured to deliver a signal indicative of the torque of the power output, e.g., a rotary or reactionary torque sensor.

Controller 104 may include one or more microprocessors, a memory, a data storage device, a communications hub, and/or other components known in the art. It is contemplated that controller 104 may be further configured to receive additional inputs (not shown) indicative of various operating parameters of system 10 and/or additional components, such as, for example, temperature sensors, position sensors, and/or any other parameter known in the art. It is also contemplated that controller 104 may be preprogrammed with parameters and/or constants indicative of and/or relating to system 10. It is also contemplated that controller 104 may receive and deliver signals via one or more communication lines (not referenced) as is conventional in the art. It is further contemplated that the received and delivered signals may be any known signal format, such as, for example, a current or a voltage level.

Controller 104 may be configured to control the actuation of valve 32 to establish an appropriate pressure differential across piston 24 to achieve a desired output of hydraulic actuator 16. Specifically, controller 104 may be configured to receive input signals from operator interface device 102 and sensors 106, 108, 110 and may perform one or more algorithms to determine appropriate output signals configured to control valve 32. For example, controller 104 may determine a pressure differential across piston 24 as a function of a desired power output of hydraulic actuator 16 and an actual power output of hydraulic actuator 16. Controller 104 may perform one or more algorithms configured to determine a desired power output, e.g., a torque and/or a rotational speed, of hydraulic actuator 16 as a function of inputs from operator interface device 102, determine a pressure differential across piston 24 to achieve the desired power output, and compare the desired power output with a signal received from sensor 110 indicative of the actual power output of hydraulic actuator 16. It is contemplated that the power output may change as a function of changes to load 50.

The algorithms performed by controller 104 may be configured to manipulate inputs received from operator interface device 102 and sensors 106, 108, 110. For example, controller 104 may include algorithms configured to relate one or more variable and/or non-variable operating parameters of system 10 such as, for example, area of a head of piston 24, spring constants of springs 30a, 30b, a leakage rate between first chamber 26 and second chamber 28, a flow area of valve 32, a pressure of pressurized fluid within high and low pressure sources 34, 36, displacement of hydraulic source 14, displacement of hydraulic actuator 16, coefficients of valve 32, the signals received from operator interface device 102 and sensors 106, 108, 110, an inertia of the valve element of valve 32, a swashplate angle, and/or any other operating parameters of system 10. The algorithms may include one or more mathematical relationships configured to determine a command configured to control valve 32, to establish an appropriate pressure differential across piston 24, to thereby affect the extension and/or retraction of actuator 20, and thus the output of hydraulic source 14. By controlling hydraulic source 14, controller 104 may be configured to control a power output of hydraulic actuator 16 and correspondingly control a power output of transmission 18. As a result, controller 104 may be configured to receive a desired torque, control hydraulic actuator 16 to establish the desired torque, and compare the established torque with the desired torque and vary the output of hydraulic actuator 16 to maintain the desired torque as a function of the operating parameters of system 10. It is contemplated that the algorithms may include one or more equations, one or more two- or three-dimensional maps, one or more look-up tables, and/or any other mathematical relationship. It is also contemplated that the algorithms may be stored within a memory and may be selectively accessible and executable by controller 104.

INDUSTRIAL APPLICABILITY

The disclosed system for controlling power output may be applicable to any power transmission system wherein control of torque and/or speed output is desired. The disclosed system may be configured to control a power output as a function of changing loads acting on the system. The operation of system 10 is explained below.

Referring to FIGS. 1 and 2, system 10 may be controlled by controller 104 as a function of operator inputs communicated via operator interface device 102. For example, an operator may desire transmission 18 to output a given power to load 50. A such, power source 12 may be controlled to deliver a first power output to transmission 18 and a second power output to hydraulic source 14. Hydraulic source 14 may establish a circulation of pressurized fluid within first and second passages 15a, 15b to operate hydraulic actuator 16. For example, hydraulic source 14 may establish a circulation of pressurized fluid dependent upon an angle of a swashplate of a swashplate pump. Hydraulic actuator 16 may deliver a third power output to transmission 18 as a function of the displacement of hydraulic source 14. Transmission 18 may combine the first and third power outputs and deliver the combined power output to load 50. It is contemplated that changes in displacement of hydraulic source 14 may correspond to changes in the third power output and, as such, may affect changes in the power output delivered by transmission 18 to load 50. It is also contemplated that the third power output may increase and/or decrease the first power output. As such, the combined power output delivered from transmission 18 to load 50 may include a continuously variable power output as a function of the first and third power outputs.

Controller 104 may receive signals from sensors 106, 108, 110 and may perform one or more algorithms to establish and/or maintain the desired power output of transmission 18. It is noted that the desired power output may include a torque and speed component and may have a power limit as a function of physical conditions of one or more components of system 10. For example, it may be desirable to output a power from power source 12 to operate hydraulic source 14 and hydraulic actuator 16 within a predetermined torque and speed envelope so as to reduce the potential for causing damage to power source 12. As such, controller 104 may further be configured to control power source 12 and accordingly limit the power input to hydraulic source 14 by, for example, limiting power transmitted from power source 12. It is also contemplated that controller 104 may operate in different modes, e.g., a first mode to maintain a desired torque output or a second mode to maintain a desired rotational speed output.

For example, controller 104 may determine a desired torque output of system 10 as a function of operator inputs and may determine a corresponding desired torque output of hydraulic actuator 16. Controller may compare the desired torque output of hydraulic actuator 16 with a sensed torque output of hydraulic actuator 16 as communicated by sensor 110 and perform one or more algorithms to determine an appropriate pressure differential across piston 24 to establish an appropriate position of piston 24 relative to cylinder 22 to substantially match the desired output torque of hydraulic actuator 16 and the sensed output torque of hydraulic actuator 16 (e.a., step 304 of method 300).

Controller 104 may continuously or periodically monitor the output and desired torques of hydraulic actuator 16 and may continuously or periodically determine appropriate pressure differentials across piston 24. As such, controller 104 may affect actuation of valve 32 and thus extension and/or retraction of actuator 20 to thereby maintain the output torque of hydraulic actuator 16 as a function of the desired torque as load 50 changes (e.g.. step 302 of method 300). It is contemplated that the torque output of hydraulic actuator 16 may change because of changes to load 50, such as, traction devices propelling a work machine up an incline, a work implement transitioning from soft soil to hard soil, and/or other external loads transmitted to transmission 18. It is also contemplated that a similar operation may be applicable to determine and maintain a desired speed output of system 10.

Because system 10 establishes and maintains a desired power output as a function of varying loads, system 10 may control a torque and/or speed output as a function of a desired torque and/or speed output and an actual torque and/or speed output. As such, system 10 may be capable of responding to changing loads 50 acting on and affecting the power output from transmission 18.

It will be apparent to those skilled in the art that various modifications and variations can be made to the disclosed system for controlling power output. Other embodiments will be apparent to those skilled in the art from consideration of the specification and practice of the disclosed system. It is intended that the specification and examples be considered as exemplary only, with a true scope being indicated by the following claims and their equivalents

What is claimed is:

1. A system for controlling power output comprising:
   a first hydraulic actuator configured to output a first torque to a geared transmission;
   a source of pressurized fluid configured to supply a first flow of pressurized fluid to the first hydraulic actuator;
   a second actuator configured to receive a second flow of pressurized fluid;
   a first sensor configured to sense the first torque;
   a second sensor configured to sense a first pressure of the first flow of pressurized fluid; and
   a controller configured to selectively vary the first flow of pressurized fluid as a function of the movement of the second actuator in response to the sensed first torque, a predetermined torque, and the sensed first pressure.

2. The system of claim 1, wherein the source of pressurized fluid is a variable displacement pump and the controller is configured to adjust a displacement of the pump to vary the first torque.

3. The system of claim 1, wherein the controller is configured to control the first flow of pressurized fluid to establish the first torque to be substantially equal to the predetermined torque.

4. The system of claim 3, wherein the predetermined torque is a desired torque corresponding to a first signal indicative of a position of an operator interface device.

5. The system of claim 4, further including: the first sensor configured to communicate a second signal, indicative of the first torque, to the controller;
   wherein the controller is further configured to compare the first signal with the second signal.

6. The system of claim 1, further including a power source configured to output a second torque to the source of pressurized fluid and output a third torque to the geared transmission.

7. The system of claim 1, wherein:
   the source of pressurized fluid is a variable displacement pump having a swashplate configured to adjust the flow of pressurized fluid as a function of an angle of the swashplate;
   the second actuator includes a piston movable relative to a cylinder; and
   movement of the piston relative to the cylinder changes the angle of the swashplate.

8. The system of claim 1, wherein the second actuator includes a cylinder and a piston movable relative to the cylinder and the controller is further configured to determine a pressure differential across the piston, the pressure differential configured to affect control of the flow of pressurized fluid.

9. A method for controlling a power output comprising:
   supplying a first flow of pressurized fluid to a first hydraulic actuator and generating a first torque, the first torque selectively changing as a function of a load operatively connected to the hydraulic actuator via a geared transmission;
   selectively supplying a second flow of pressurized fluid to a second actuator;
   selectively varying the first flow of pressurized fluid as a function of the movement of the second actuator;
   sensing the first torque;
   sensing a first pressure of the first flow of pressurized fluid; and
   selectively moving the second actuator as a function of the sensed first torque and first pressure.

10. The method of claim 9, further including:
generating a second torque;
supplying a first portion of the second torque to a source of pressurized fluid; supplying a second portion of the second torque to the geared transmission; and
supplying the first torque to the transmission;
wherein the transmission is configured to supply a third torque to the load, the load operatively connected to the geared transmission.

11. The method of claim 10, wherein the source of pressurized fluid is configured to supply the first flow of pressurized fluid to the hydraulic actuator.

12. The method of claim 10, wherein the load operatively connected to the transmission changes.

13. The method of claim 10, wherein the geared transmission operatively combines the first and second torques to establish the third torque, the third torque being continuously variable at least within a predetermined range of torques.

14. A transmission system comprising:
a power source configured to produce a torque and a speed;
a first transmission device operatively connected to the power source and configured to output a first power output to a load;
a second transmission device operatively connected to the power source and the first transmission device, the second transmission device configured to output a second power output to the first transmission device as a function of a first flow of pressurized fluid;
an actuator configured to selectively receive a second flow of pressurized fluid;
a sensor configured to sense the second power output;
a sensor configured to sense the pressure of the first flow of pressurized fluid; and
a controller configured to selectively move the actuator as a function of the sensed first torgue and first pressure to vary the second power output.

15. The transmission of claim 14, wherein the second power output changes in response to changes in the load.

16. The transmission of claim 14, wherein the second transmission device includes:
a hydraulic motor configured to produce the second power output; and
a variable displacement pump configured to supply the first flow of pressurized fluid to the hydraulic motor.

17. The transmission of claim 14, wherein the actuator includes first and second chambers separated by a piston, the transmission further including:
a valve configured to selectively communicate pressurized fluid to and from the first and second chambers to affect movement of the piston wherein movement of the piston varies the first flow of pressurized fluid.

* * * * *